United States Patent
Ctvrtnicek et al.

(10) Patent No.: US 7,091,692 B2
(45) Date of Patent: Aug. 15, 2006

(54) ELECTROMOTIVE ADJUSTMENT DRIVE

(75) Inventors: Martin Ctvrtnicek, Bünde (DE); Ralf Bokämper, Lübbecke (DE)

(73) Assignee: Dewert Antriebs- und Systemtechnik GmbH & Co. KG, Kirchlengern (DE)

( * ) Notice: Subject to any disclaimer, the term of this patent is extended or adjusted under 35 U.S.C. 154(b) by 49 days.

(21) Appl. No.: 10/479,927

(22) PCT Filed: Jun. 26, 2002

(86) PCT No.: PCT/EP02/07068

§ 371 (c)(1),
(2), (4) Date: Dec. 5, 2003

(87) PCT Pub. No.: WO03/005526

PCT Pub. Date: Jan. 16, 2003

(65) Prior Publication Data

US 2004/0169423 A1 Sep. 2, 2004

(30) Foreign Application Priority Data

Jun. 30, 2001 (DE) .......................... 201 10 841 U

(51) Int. Cl.
H02P 23/00 (2006.01)

(52) U.S. Cl. ...................... 318/806; 318/450; 361/170

(58) Field of Classification Search ................ 307/66, 307/125, 86, 326, 150, 116, 140, 127, 129; 318/721, 807, 712, 445, 799, 806, 450; 361/160, 361/170

See application file for complete search history.

(56) References Cited

U.S. PATENT DOCUMENTS 4,672,293 A * 6/1987 Crampton ................... 320/128
5,019,767 A * 5/1991 Shirai et al. ................. 320/112

(Continued)

FOREIGN PATENT DOCUMENTS

DE          91 16 509 U       12/1992

(Continued)

*Primary Examiner*—Rajnikant B. Patel
(74) *Attorney, Agent, or Firm*—Henry M. Feiereisen

(57) ABSTRACT

The invention relates to an electromotive adjustment drive which is operated by a safety voltage, for instance, an adjustment drive for the adjustable components of pieces of furniture. The adjustment drive is equipped with a hand-operated device and a control unit which is operated with the device and connected by at least one cable to a voltage source to which the mains voltage can be supplied. The adjustment drive is so configured as to allow an electrical separation between the voltage source and the transformer, when the adjustment drive is not in operation, without requiring special cables. Furthermore, the adjustment drive should be configured in such a way that the item equipped with the adjustment drive does not contain any cables or lines to which mains voltage is supplied. According to the invention, there is provided a power supply module (12) which is spatially separated from the control unit (14) and arranged between the control unit (14) of the adjustment drive (11) and the voltage source. Mains voltage is supplied to the power supply module on the input side and safety voltage flows out on the output side. The power supply module (12) contains at least one transformer (18) and an upstream power disconnection circuit (19). The power chord (16) leading from the voltage source to the power supply module (12) is detachably connected by means of a plug-and-socket connector. The power chord is fitted with a plug and the housing of the power supply module (12) is equipped with a socket receptacle or a jack. The transformer (18) is an electronic transformer.

16 Claims, 2 Drawing Sheets

U.S. PATENT DOCUMENTS 5,347,167 A * 9/1994 Singh .................. 307/125
5,528,449 A * 6/1996 Koch .................. 361/160

FOREIGN PATENT DOCUMENTS

| | | |
|---|---|---|
| DE | 92 12 599 U1 | 1/1993 |
| DE | 41 39 647 A1 | 6/1993 |
| DE | 44 00 657 C1 | 3/1995 |
| DE | 298 16 022 U1 | 12/1998 |
| DE | 695 10 221 T2 | 2/2000 |
| DE | 199 36 983 A1 | 3/2001 |
| DE | 100 12 050 A1 | 10/2001 |
| EP | 0 651 492 A | 5/1995 |
| EP | 0 887 904 A | 12/1998 |
| WO | WO 00/13554 * | 3/2000 |

* cited by examiner

ELECTROMOTIVE ADJUSTMENT DRIVE

BACKGROUND OF THE INVENTION

The invention relates to an electromotive adjustment drive which can be operated by a safety voltage, in particular a drive for a piece of furniture, and which is equipped with a control unit operated by a hand-operated device and connected by at least one cable with a voltage source supplied with the mains voltage. Adjustment drives of the type involved here are operated by low-voltage motors having a supply voltage provided by a transformer connected to the electric power grid. The motors may be operated by alternating voltage as well as direct voltage. Safety reasons dictate however that the voltage is decreased substantially. Adjustment drives of standard construction have transformers integrated in the housing of the adjustment drive. As a consequence, the current-carrying cable between the voltage source and the transformer is live. When the adjustment drive is utilized to operate a piece of furniture, many users perceive the presence of live electric or electronic components or component groups in the piece of furniture, e.g. a chair or a bed, as objectionable.

It has therefore been proposed to arrange the transformer outside the housing of the adjustment drive, even in those cases when the available installation space is too small to accommodate the adjustment drive, because the removal of the transformer renders the dimensions of the adjustment drive smaller. Such detached transformers are also called as add-on transformers. Up to a particular output, the transformer may also be configured as power plug so as to be positioned in immediate proximity to a socket receptacle. Furthermore, this configuration has the drawback that the mains voltage is continuously supplied to the transformer. No-load losses are converted into heat, thereby incurring added costs. It has therefore been proposed to separate the transformer from the voltage source through disconnection from the voltage source during the conceivably very long idle period. This, however, entails the drawback that the power disconnection requires for control a particular cable which must be so configured that the mains voltage as well as the control voltage can be applied. Another option would be to lay two different cables; this requires however a complicated insulation so that costs are further increased.

The control unit is typically integrated either in the housing of the adjustment drive or in a housing which is connected to the housing of the adjustment drive. The hand-operated device is normally implemented as a hand switch having several push buttons and outputting signals which are transmitted to the control unit via a cable or also wireless.

SUMMARY OF THE INVENTION

The invention is based on the object to so configure an electromotive adjustment drive of the afore-described type that the separation between the voltage source and the transformer is possible at shutdown of the adjustment drive, without requiring a special cable. Moreover, the adjustment drive is so configured that the item equipped with the adjustment drive does not have any cable or lines which are supplied with the mains voltage.

The posed object is attained by providing between the control unit and the voltage source a power supply module which is spatially separate from the control unit and has an input side for input of the mains voltage and an output side for output of a safety voltage, and by providing the power supply module with at least one transformer and an upstream power disconnection circuit.

The solution according to the invention thus realizes that the mains voltage is supplied only to the cable between the voltage source and the power supply module. The cable connecting the power supply module with the control unit can thus be implemented as an inexpensive low-voltage cable. The cable between the voltage source and the power supply module can be made extremely short. Moreover, any commercially available cable can then be used. This configuration eliminates the otherwise required special cable. Furthermore, the adjustment drive, installed in an item, for example a piece of furniture, is supplied now only with the safety voltage so as to realize a greatest possible safety. Through provision of the power disconnection circuit, the transformer and optionally further electric or electronic components as well as the cable connection and the adjustment drive itself including the control unit are currentless when not in operation. The adjustment drives concerned here are shipped to many countries. It is known that not only voltages and frequencies vary but also the electric connectors. It is therefore provided to employ plug-and-socket connectors for detachably connecting the power supply module and the power chord, which leads to the voltage source, and to configure preferably the power chord with a plug and the housing of the power supply module with a socket receptacle or jack. It is then easily possible to exchange the power chord with the various national plugs. Thus, storage for the power supply modules is reduced so that costs, too, are reduced.

It is especially advantageous to use an electronic transformer as transformer because it affords the possibility to use for various and diverse national input voltages a respective power pack having a fairly large input voltage range. This further reduces storage. Suitably, the individual functional units are made of modular construction so that it becomes possible to retrofit through addition of single modules. These modules can then be assembled in a most simple manner through attached connectors to a structural unit, without the need for mechanical connecting elements. The modular configuration has the further advantage that the power supply module can be modified later or even expanded. Advantageously, the power disconnection circuit includes at least one, preferably two, switching elements. In this way, it is possible in a most simple manner to implement the separation from the mains voltage. Especially advantageous is the provision of a cable to connect the power disconnection circuit for operation with the hand-operated device. As the hand-operated device is situated in the grip area of a person, actuation can be carried out extremely simple and ergonomically beneficial. The electromotive adjustment drives involved here may be equipped with d.c. motors as well as a.c. motors. When using d.c. motors, there is provided a rectifier and a filter element downstream of the transformer. Rectification of the alternating current is then also realized in the power supply module. Suitably, an emergency voltage source is connected downstream of the transformer. This may be, for example, a battery or an accumulator. As such voltage sources must be replaced occasionally, replacement becomes extremely simple because the power supply module is easy to access. In the event, several cables are required between the power supply module and the control unit, the power supply module is provided on its output side with a cable uniting element which may be provided also, for example, with a socket receptacle so that a single cable with a respective number of wires for connection to the control unit can be used. The individual components of the modular unit are dependent on the function to be met by the adjustment drive and possibly on safety regulations that have to be observed.

BRIEF DESCRIPTION OF THE DRAWING

The invention will now be described in more detail with reference to the attached drawings, in which.

DETAILED DESCRIPTION OF THE PREFERRED EMBODIMENTS

Figure 1:
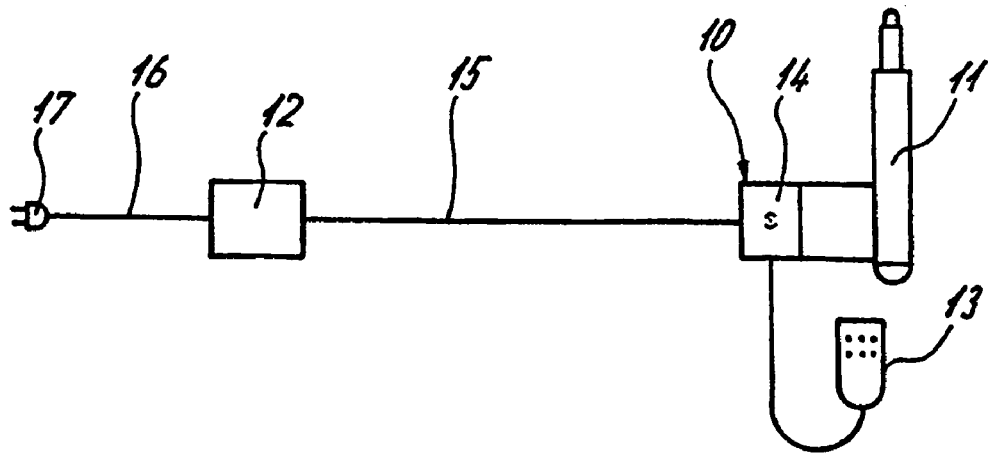
FIG. 1 is an exemplified embodiment of an electromotive adjustment drive equipped with a power supply module.

In the illustrated exemplified embodiment, the electromotive adjustment drive 10 includes a linear drive 11 having a housing which accommodates all functional parts including a drive motor. The electromotive adjustment drive 10 is further equipped with a power supply module 12 and a hand-operated device 13 in the form of a hand switch. Attached to the housing of the linear drive 11 is further a control unit 14. As clearly shown in FIG. 1, the power supply module 12 is positioned at a distance to the linear drive 11 such that it is disposed also outside of an item in which the linear drive 11 is installed. The connection between the control unit 14 and the power supply module 12 is implemented by a, preferably, multicore cable 15. The power supply module 12 should be disposed as close as possible to a voltage source. The connection between the voltage source and the power supply module 12 is realized by a power chord 16 which is equipped with a plug 17.

Figure 2:
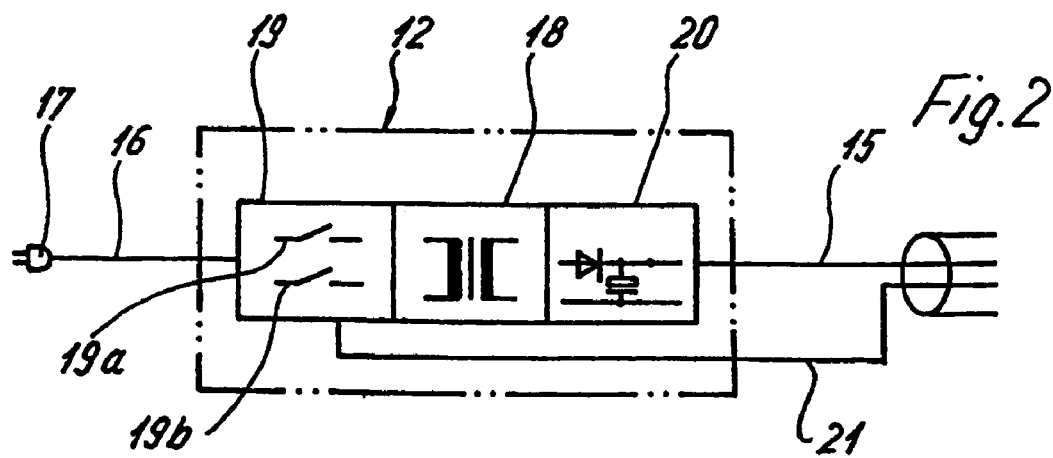
FIG. 2 is a possible embodiment of the power supply module.

In the configuration according to FIG. 2, the power supply module includes three components, namely a transformer 18, which, preferably, is an electronic transformer, a power disconnection circuit 19 placed upstream of the transformer 18, and a rectifier circuit 20 which further includes a filter element. In the exemplified embodiment, the power disconnection circuit 19 is activated via a control cable 21 which is connected, preferably, to the hand-operated device 13. The power disconnection circuit 19 includes two switches 19a and 19b in parallel connection. FIG. 2 shows the switches 19a, 19b open, this corresponds to the idle state of the linear drive 11. The circuit diagram shows that all components, which are disposed downstream of the power disconnection circuit 19 and can be supplied with current, are currentless. The transformer 18, the power disconnection circuit 19 and the rectifier 20 may be arranged in a common housing.

Figure 3:
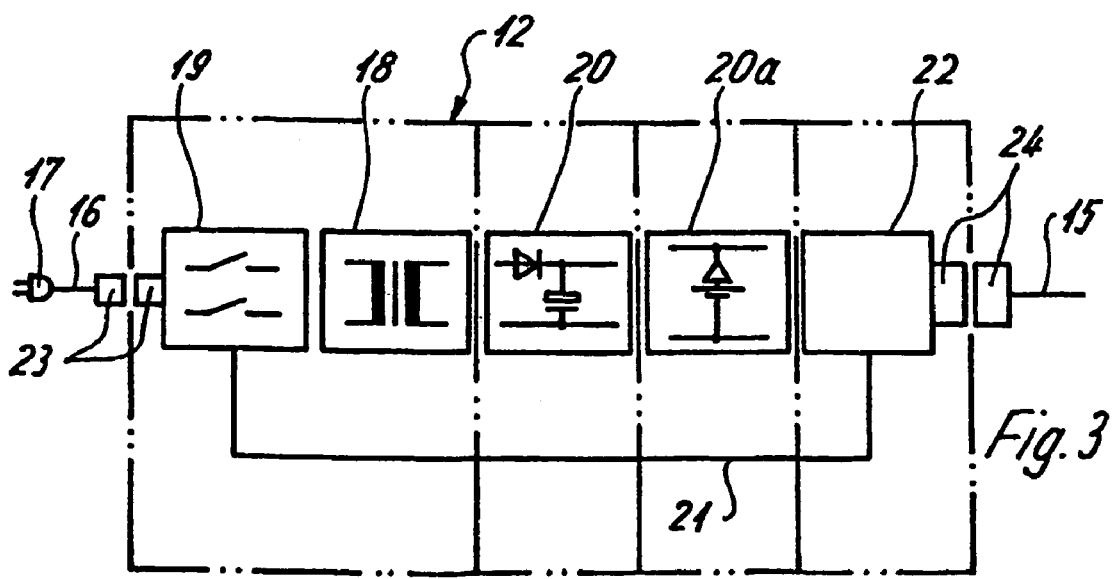
FIG. 3 is a power supply module of modular construction.
Figure 4:
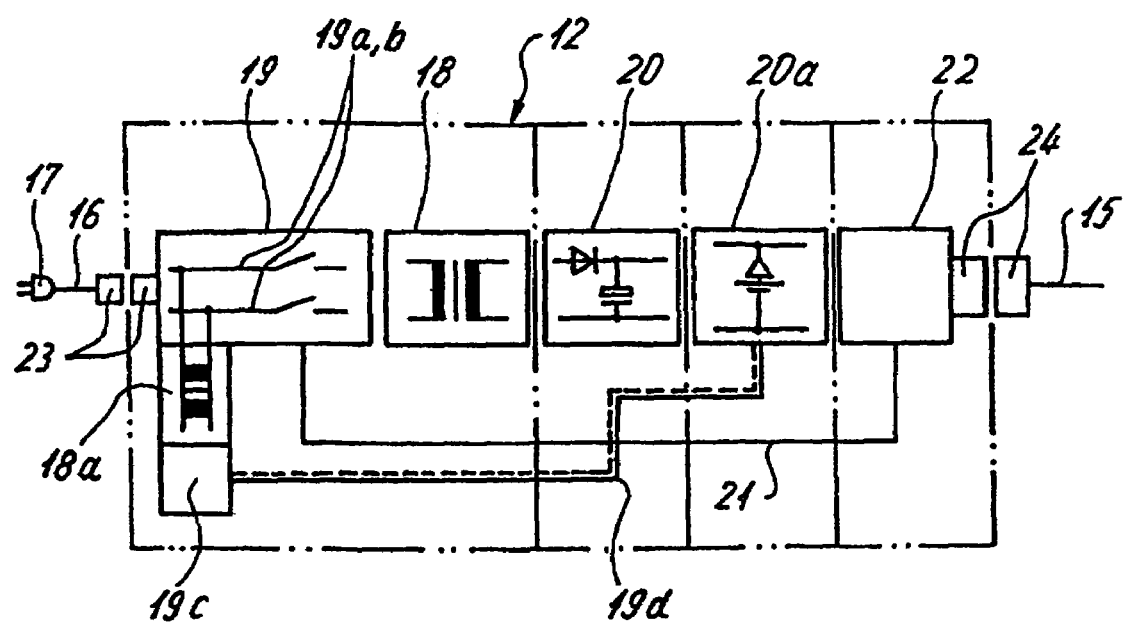
FIG. 4 is a power supply module according to FIG. 3, however with a voltage supply for the power disconnection circuit.

FIG. 3 shows a modular construction of the power supply module 12. Same parts are designated by same reference characters. In contrast to the configuration according to FIG. 3, this configuration is further equipped with an emergency power supply 20a, for example a battery or an accumulator, as well as with a cable uniting element 22. The individual components 18 to 22 may be so designed that they can be locked or clipped together without mechanical connecting elements. The modular construction is indicated by the vertical, dash-dotted lines. FIG. 3 shows further that the power chord 16 can be connected by a plug-and-socket connector 23, for example by a plug and a socket receptacle, with the power disconnection circuit 19. The same is true also for the cable 15 which is connected via plug-and-socket connectors 24 with the cable uniting element 22.

The power supply module 12 should at least contain the power disconnection circuit 19 and the transformer 18. The configuration and the number of the remaining components depend on the function to be met by the drive 11. For example, a rotary drive may be used as well as a dual drive which is equipped with two drive motors. The voltage supply 19c for the power disconnection circuit 19 is realized by an auxiliary voltage source either from the electrical power grid through connection of the contacts 19a, 19b of the power disconnection circuit 19, whereby a secondary transformer 18a transforms the voltage. As an alternative, it is also possible to use as auxiliary voltage source a battery or an accumulator which is located in the control unit 14. This is implemented via a connection 19d of the auxiliary voltage source 20a. Especially advantageous. The modular construction and the spatial separation of the apparatus have an especially advantageous effect so that a change of the auxiliary voltage source can be carried in an extremely simple manner unlike conventional constructions.

The invention is not limited to the illustrated exemplified embodiment. Essential is the provision of a power supply module 12 which is spatially separated from the control unit 14 and disposed between the control unit 14 of the drive 11 and the voltage source and which has an input side for input of the mains voltage and an output side for output of the safety voltage.

The invention claimed is:

1. An electromotive adjustment drive which can be operated by a safety voltage for a piece of furniture, comprising:
   a motor having a control unit;
   a hand-operated device for operating the control unit;
   a voltage source connected by at least one cable with the control unit and supplied with mains voltage; and
   a power supply module arranged between the control unit end the voltage source and spatially separate from the control unit, said power supply module having an input side for input of the mains voltage and an output side for output of a safety voltage, said power supply module including at least one transformer, a power disconnection circuit connected upstream of the transformer, a rectifier circuit connected downstream of the transformer, and a housing for jointly accommodating the transformer, the power disconnection circuit, and the rectifier circuit,
   wherein the power disconnection circuit includes two switching elements disposed in parallel connection for respectively making or breaking a current supply.

2. The electromotive adjustment drive of claim 1, and further comprising a power chord having one end detachably connected to the power supply module and another end for detachable connection to the voltage source.

3. The electromotive adjustment drive of claim 2, wherein the power supply module and the power chord are connected via a plug-and-socket connection.

4. The electromotive adjustment drive of claim 2, wherein the power chord has a plug, and the power supply module has a housing provided with a socket for insertion of the plug.

5. The electromotive adjustment drive of claim 1, wherein the transformer is an electronic transformer.

6. The electromotive adjustment drive of claim 1, and further comprising a cable for connecting the power disconnection circuit for operation with the hand-operated device.

7. The electromotive adjustment drive of claim 1, wherein the rectifier circuit includes a filter element.

8. The electromotive adjustment drive of claim 1, wherein the power supply module includes an emergency voltage source connected downstream of the transformer.

9. The electromotive adjustment drive of claim 8, wherein the emergency power supply includes a battery or an accumulator.

10. The electromotive adjustment drive of claim 1, and further comprising a cable uniting element disposed on an output side of the power supply module.

11. The electromotive adjustment drive of claim 1, and further comprising a cable for connecting the power supply module to the control unit, wherein the cable and the power supply module are detachably connected to one another via a plug-and-socket connection.

12. The electromotive adjustment drive of claim 1, wherein individual components of the power supply unit ton part of a modular kit and are interconnectable.

13. The electromotive adjustment drive of claim 1, wherein the power disconnection circuit lies a voltage supply which is realized by an auxiliary voltage source.

14. The electromotive adjustment drive of claim 13, wherein the auxiliary voltage source is a secondary transformer powered from an electrical power grid.

15. The electromotive adjustment drive of claim 13, wherein the auxiliary voltage source is a battery or accumulator provided in the control unit.

16. The electromotive adjustment drive of claim 13, wherein the power supply module includes an emergency voltage source connected downstream of the transformer, said voltage supply of the power disconnection circuit being electrically connected via a connection with the emergency voltage source.

* * * * *

UNITED STATES PATENT AND TRADEMARK OFFICE
CERTIFICATE OF CORRECTION

PATENT NO. : 7,091,692 B2
APPLICATION NO. : 10/479927
DATED : August 15, 2006
INVENTOR(S) : Martin Ctvrtnicek It is certified that error appears in the above-identified patent and that said Letters Patent is hereby corrected as shown below:

<u>Column 5, line 16</u>: Change "ton" to --form--

<u>Column 6, line 2</u>: Change "lies" to --has--

Signed and Sealed this

Ninth Day of January, 2007

JON W. DUDAS
*Director of the United States Patent and Trademark Office*